US011573561B2

(12) United States Patent
Sarah et al.

(10) Patent No.: US 11,573,561 B2
(45) Date of Patent: Feb. 7, 2023

(54) METHODS AND SYSTEMS FOR AUTOMATED CONDITION-BASED MAINTENANCE OF MECHANICAL SYSTEMS

(71) Applicant: GENERAL ELECTRIC COMPANY, Schenectady, NY (US)

(72) Inventors: Ann Sarah, Karnataka (IN); Robert Haley, Jr., Greenville, SC (US); Sidharth Abrol, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 901 days.

(21) Appl. No.: 16/216,197

(22) Filed: Dec. 11, 2018

(65) Prior Publication Data

US 2020/0183377 A1    Jun. 11, 2020

(51) Int. Cl.
*G05B 23/02* (2006.01)

(52) U.S. Cl.
CPC ..... *G05B 23/0283* (2013.01); *G05B 23/0281* (2013.01); *G05B 23/0286* (2013.01)

(58) Field of Classification Search
CPC ............ G05B 23/0281; G05B 23/0283; G05B 23/0286; G05B 23/0254; G05B 23/0267; G05B 23/024; G05B 23/0221; G05B 23/0235; G05B 23/0229; G05B 23/0294; G05B 19/41875; G05B 19/4184; G06F 11/008; G06F 11/3452; G06F 11/3495; G06F 11/3447; G01M 13/028; G01M 13/045; G01H 1/003
USPC ...... 340/679; 700/28, 30, 48, 108, 110, 286; 702/33–35, 56, 58, 60, 64, 85, 179, 702/181–183, 185, 187–188; 703/2, 18; 714/25, 40, 48
See application file for complete search history.

(56) References Cited

U.S. PATENT DOCUMENTS 6,484,109 B1 * 11/2002 Lofall .................... G01H 1/003
                                                                  702/56
6,633,782 B1    10/2003 Schleiss et al.
7,100,081 B1 *  8/2006 Purdy .............. G05B 19/41875
                                                                  714/25

(Continued)

FOREIGN PATENT DOCUMENTS

EP       2 869 152 A1    5/2015
EP       3 246 769 A1   11/2017
WO    2016153895 A1     9/2016

OTHER PUBLICATIONS

International Search Report and Written Opinion, PCT/US2019/065327, dated Mar. 30, 2020 (15 pp.).

*Primary Examiner* — Jeffrey P Aiello
(74) *Attorney, Agent, or Firm* — Eversheds Sutherland (US) LLP (57) ABSTRACT

This application provides methods and systems for automated condition-based maintenance of mechanical systems. Example systems may at least one memory coupled to one or more computer processors that are configured to receive first data from the mechanical system indicative of performance of a first component of the mechanical system, determine, using the first data, a first performance metric for the first component, determine, using the first performance metric, a probability value that a fault has occurred at the first component, and determine, using the probability value, a predicted length of time until failure of the first component.

19 Claims, 8 Drawing Sheets

(56) References Cited

U.S. PATENT DOCUMENTS

| | | | |
|---|---|---|---|
| 8,239,170 B2 | 8/2012 | Wegerich | |
| 8,660,980 B2 | 2/2014 | Herzog | |
| 8,725,456 B1* | 5/2014 | Saha | G05B 23/0283 |
| | | | 702/182 |
| 9,250,625 B2 | 2/2016 | Herzog | |
| 2003/0130810 A1* | 7/2003 | Smulders | G01N 29/12 |
| | | | 702/56 |
| 2007/0067678 A1* | 3/2007 | Hosek | G05B 23/0235 |
| | | | 714/25 |
| 2011/0208567 A9* | 8/2011 | Roddy | G06Q 10/0637 |
| | | | 705/305 |
| 2012/0283963 A1* | 11/2012 | Mitchell | F01D 21/003 |
| | | | 702/34 |
| 2015/0106058 A1* | 4/2015 | Mazzaro | G01M 99/005 |
| | | | 702/181 |
| 2016/0091393 A1* | 3/2016 | Liao | G01M 13/00 |
| | | | 702/34 |
| 2017/0091358 A1* | 3/2017 | Zhang | G06F 30/17 |
| 2017/0336784 A1* | 11/2017 | Koppikar | G05B 23/0229 |
| 2019/0094286 A1* | 3/2019 | Becher | G06N 3/08 |

\* cited by examiner

METHODS AND SYSTEMS FOR AUTOMATED CONDITION-BASED MAINTENANCE OF MECHANICAL SYSTEMS

TECHNICAL FIELD

This application and the resultant patent relate generally to mechanical systems and more particularly relate to detecting and predicting faults and/or failure of mechanical systems and/or related components.

BACKGROUND OF THE INVENTION

A power plant may include interconnected components that can be affected by multiple operating processes. Generally described, a combined cycle power generation system uses a combination of a gas turbine and a steam turbine to produce electrical power or otherwise to drive a load. Specifically, a gas turbine cycle may be operatively combined with a steam turbine cycle by way of a heat recovery steam generator and the like. The heat recovery steam generator may be a multi-section heat exchanger that allows feedwater for the steam generation process to be heated by the hot combustion gases of the gas turbine exhaust. The primary efficiency of the combined cycle power plant arrangement is the utilization of the otherwise "wasted" heat of the gas turbine exhaust. Power plant operators thus aim to generate the maximum possible useful work from the heat in the gas turbine exhaust.

Some power plants may have more than one feedwater system for a heat recovery steam generator. For example, a primary feedwater system may be used for the heat recovery steam generator, while a secondary feedwater system may be used as a backup system. The secondary feedwater system, however, may be costly and may not affect performance of the heat recovery steam generator. In addition, the secondary feedwater system may be needed primarily in instances where the primary feedwater system is unavailable. Unavailability may be due to component failure, service, and so forth. Expected unavailability, such as planned service, may be acceptable as the power plant may plan accordingly. However, unexpected unavailability may be unacceptable, and, in some cases, may result in reliance on the secondary feedwater system.

SUMMARY OF THE INVENTION

This application and the resultant patent provide a fault detection system for detecting faults at a mechanical system. The fault detection system may include at least one memory storing computer-executable instructions, and one or more computer processors coupled to the at least one memory and configured to execute the computer-executable instructions to receive first data from the mechanical system indicative of performance of a first component of the mechanical system, determine, using the first data, a first performance metric for the first component, determine, using the first performance metric, a probability value that a fault has occurred at the first component, and determine, using the probability value, a predicted length of time until failure of the first component.

This application and the resultant patent further provide a method for detecting faults at a mechanical system. The method may include receiving, by a server, first data from the mechanical system indicative of performance of a first component of the mechanical system, determining, using the first data, a first performance metric for the first component, determining, using the first performance metric, a probability value that a fault has occurred at the first component, and determining, using the probability value, a predicted length of time until failure of the first component.

This application and the resultant patent further provide a fault detection system for detecting faults at a mechanical system. The fault detection system may include at least one memory storing computer-executable instructions, and one or more computer processors coupled to the at least one memory and configured to execute the computer-executable instructions to receive first data and second data from the mechanical system indicative of performance of a first component of the mechanical system, determine, using the first data and the second data, a first performance metric for the first component, determine, using the first performance metric, a likelihood that a fault will occur at the first component within a predetermined time interval, and determine a predicted length of time until failure of the first component.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
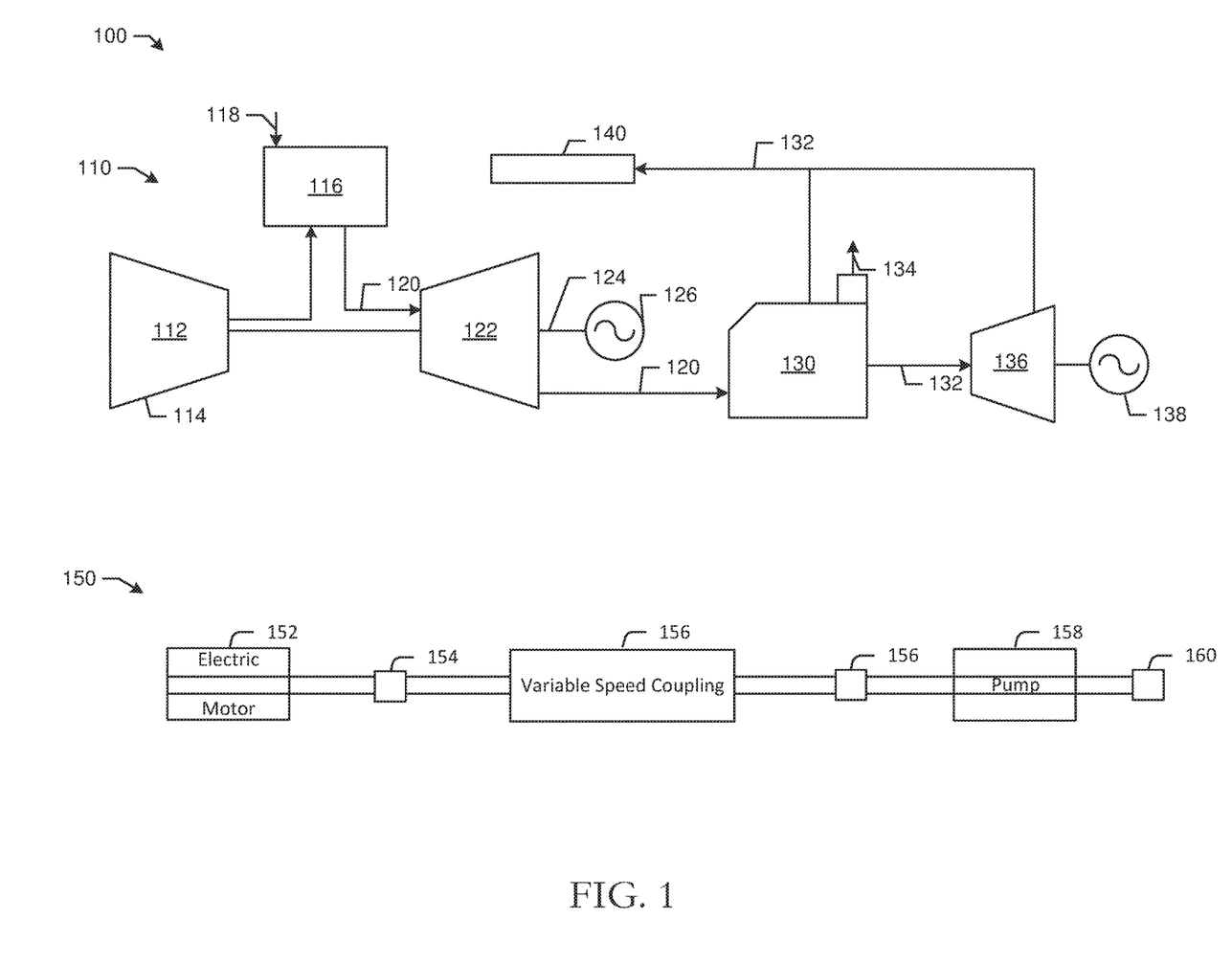
FIG. 1 is a schematic diagram of a known combined cycle power plant with a gas turbine, a steam turbine, and a heat recovery steam generator, as well as components of a feedwater system.

Referring now to the drawings, in which like numerals refer to like elements throughout the several views. FIG. 1 is a schematic diagram of exemplary combined cycle system 100. The combined cycle system 100 includes a gas turbine engine 110. The gas turbine engine 110 may include a compressor 112. The compressor 112 compresses an incoming flow of air 114. The compressor 112 delivers the compressed flow of air to a combustor 116. The combustor 116 mixes the compressed flow of air with a pressurized flow of fuel 118 and ignites the mixture to create a flow of combustion gases 120. Although only a single combustor 116 is shown, the gas turbine engine 110 may include any number of combustors 116 positioned in a circumferential array and the like. The flow of combustion gases 120 is in turn delivered to a turbine 122. The flow of combustion gases 120 drives the turbine 122 so as to produce mechanical work. The mechanical work produced in the turbine 122 drives the compressor 112 via a shaft 124 and an external load 126 such as an electric generator and the like.

The gas turbine engine 110 may use natural gas, various types of syngas, liquid fuels, and/or other types of fuels and blends thereof. The gas turbine engine 110 may have different configurations and may use other types of components. Other types of gas turbine engines also may be used herein. Multiple gas turbine engines, other types of turbines, and other types of power generation equipment also may be used herein together.

The combined cycle system 100 also may include at least one heat recovery steam generator 130 and a steam turbine 136. The heat recovery steam generator 130 may recover heat from the combustion gases 120 exiting the gas turbine engine 110 to create a flow of steam 132 for expansion in the steam turbine 136. The steam turbine 136 may drive a further load 138 such as electrical generator and the like. The heat recovery steam generator 130 may have one or more pressure sections, such as a high pressure section, an intermediate pressure section, and a low pressure section. Each pressure section may include any combination of evaporators, superheaters and/or economizers. Each of these components typically includes a bundle of tubes across which the combustion gases 120 flow, transferring heat from the combustion gases 120 to a heat exchange fluid such as water flowing through the tubes. For example, the evaporator may include feedwater flowing through the tubes and the combustion gases 120 may cause the feedwater to turn to steam. The superheater may include steam flowing through the tubes and the combustion gases 120 may heat the steam to create superheated steam. The economizer may include feedwater flowing through the tubes and the hot combustion gases 120 may preheat the feedwater for use in the evaporator. The combustion gases 120 may exit the heat recovery steam generator 130 as a cooled exhaust gas 134. The steam 132 may be extracted from the steam turbine 136 and supplied to a heating and cooling application 140. Similarly, the steam 132 may be extracted from the heat recovery steam generator 130 and supplied to the heating and cooling application 140.

A feedwater system 150 is also illustrated in FIG. 1. The feedwater system 150 may be used to provide feedwater for the steam generation process. The feedwater system 150 may include a number of components. For example, the feedwater system 150 may include an electric motor 152, a variable speed coupling 156, and a pump 158 each coupled together using a shaft. Other configurations and components may be used.

The feedwater system 150 may include one or more sensors that can be used to detect certain measurements and/or component performance of the feedwater system 150. For example, the feedwater system 150 may include torque meters 154, 156 configured to measure torque and/or relative shaft vibration along various points of the shaft, key phasor/speed sensors, temperature sensors, flow sensors, motor winding insulation leakage current sensors, relative shaft vibration sensors, casing temperature sensors, suction sensors, pressure sensors, axial displacement sensors, and/or other sensors. One or more of the sensors may be disposed about the electric motor 152, the variable speed coupling 156, and/or the pump 158. Output, such as measurements or readings, from one or more of the sensors may be used by a fault detection system to determine whether a fault has occurred and/or a likelihood of component failure, as well as other functionality as described herein. Other configurations of feedwater systems with different types of and/or positioning of sensors may be used.

Figure 2:
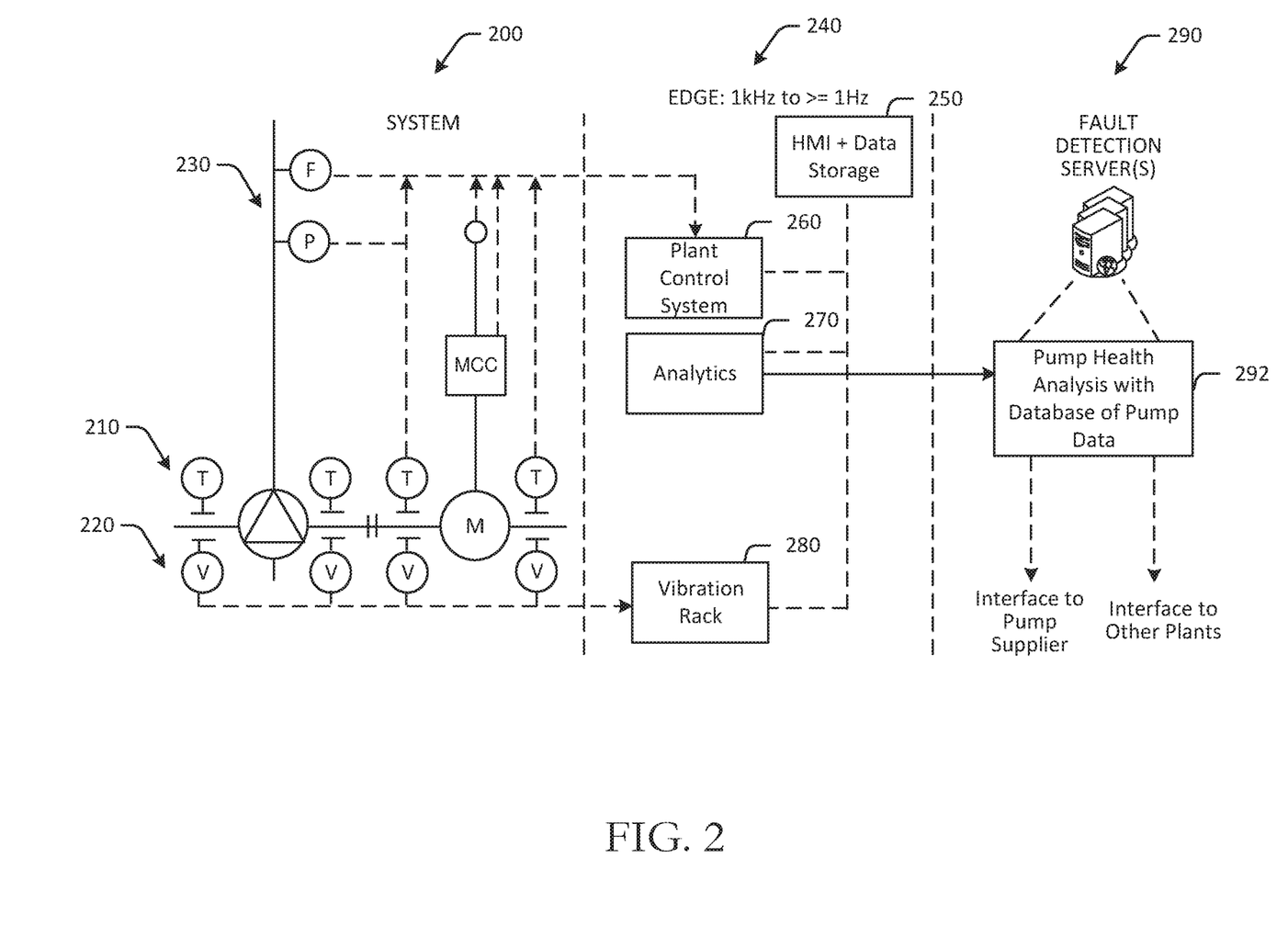
FIG. 2 is a schematic diagram of a feedwater system analytics and fault detection system as may be described herein.

FIG. 2 is a schematic diagram of a feedwater system analytics and fault detection system as may be described herein. Other embodiments may have additional, fewer, and/or different components or configurations than those discussed with respect to the example illustrated in FIG. 2.

The feedwater system analytics and fault detection system may include a feedwater system 200. Analytics and/or data captured by one or more sensors or computer systems at the feedwater system 200 may distributed using context and time from devices to fleets. For example, the schematic illustration of the feedwater system 200 includes a set of temperature sensors 210 disposed along a shaft that couples a motor and pump. In some embodiments, more than one temperature sensor may be included in the set of temperature sensors 210. The temperature sensors may collect temperature data at different points along the feedwater system 200. The feedwater system 200 may include a set of vibration sensors 220 disposed along the shaft that couples the motor and pump. In some embodiments, more than one vibration sensor may be included in the set of vibration sensors 220. The vibration sensors may collect vibration data, such as relative shaft vibration data, at different points along the feedwater system 200. The feedwater system 200 may include additional sensors, such as flow meters and/or pressure sensors 230 disposed at various positions of the feedwater system 200. The sensors may be used to capture data over time that can be used to determine performance of certain components of the feedwater system 200, as well as to determine predictive values for longevity of individual components and/or the feedwater system as a whole.

A computer system 240, which may be a local or remote computer system or controller, may be in communication with the feedwater system 200. The computer system 240 may receive data or measurements output by the one or more sensors of the feedwater system 200. The computer system 240 may include, for example, a human-to-machine interface and data storage 250, a plant control system 260, an analytics system 270, and an optional vibration rack 280. One or more of the human-to-machine interface and data storage 250, plant control system 260, analytics system 270, and vibration rack 280 may be in wired or wireless communication. For example, the components may be in communication over a data network. The human-to-machine interface and data storage 250 may include data values captured over time, alarms, operator manuals, user interface software, and/or other data. The plant control system 260 may be in communication with the feedwater system 200, including the sensors of the feedwater system 200, and may control operation of the feedwater system 200. The plant control system 260 may be used to acquire specification data for the system. The analytics system 270 may be a health analytics system that is configured to determine health statuses of various components or machines of the power plant, such as the feedwater system 200. The analytics system 270 may generate operation recommendations. The vibration rack 280 may include a maintenance port and may capture vibrational data output from the set of vibration sensors 220. The vibration data may be passed to one or more of the human-to-machine interface and data storage 250, plant control system 260, and/or analytics system 270. The frequency of data captured may be, in some instances, between about 1 kHz and about 1 Hz.

A fault detection server 290, which may include one or more remote servers or computer systems, may be in communication with the computer system 240. The fault detection server 290 may be a cloud-based server and may receive data from the computer system 240. For example, the fault detection server 290 may include a database of pump data 292. The database of pump data 292 may include current and historical pump health analysis data that may be received from the analytics system 270. Additional data may be stored or accessible by the fault detection server 290 for different components and/or for different power plants. The fault detection server 290 may aggregate data across devices and/or fleets or plants. The fault detection server 290 may be configured to interface with one or more third parties. For example, the fault detection server 290 may include an interface to a pump supplier, and an interface to other plants. Accordingly, certain data may be sent to or accessible by one or more third parties.

One or more of the computer system 240 and/or the fault detection server 290 may be configured to perform automatic fault detection, as well as isolation and prognostics for power plant equipment, by optimally choosing data modeling techniques to obtain the most accurate fault classification for an asset, such as feedwater systems for combined cycle power plants.

To determine automatic fault detection, as well as isolation and prognostics for power plant equipment, the computer system 240 and/or the fault detection server 290 may determine specifications for normal operation. For example, feedwater systems may include an induction motor driving a centrifugal pump via a hydraulic coupling (e.g., torque converter). The computer system 240 and/or the fault detection server 290 may determine characteristic curves for the motor and pump, where normal operation may be defined as the locus of the curves for a given operational set point. Abnormal operation may be defined as deviation from the curves. Deviation from normal operation may be accomplished by monitoring the operating efficiency of the system. If operating efficiency decreases, the computer system 240 and/or the fault detection server 290 may determine what has changed at the system to cause the decrease in operating efficiency. In some instances, such as for centrifugal pumps, one or more affinity rules or laws may be used to determine shifting of operating point changes for a constant efficiency. In one embodiment, the computer system 240 and/or the fault detection server 290 may determine, based on the data, that an operating efficiency of the mechanical system has decreased, where a decrease in operating efficiency is indicative of abnormal operation.

Figure 3:
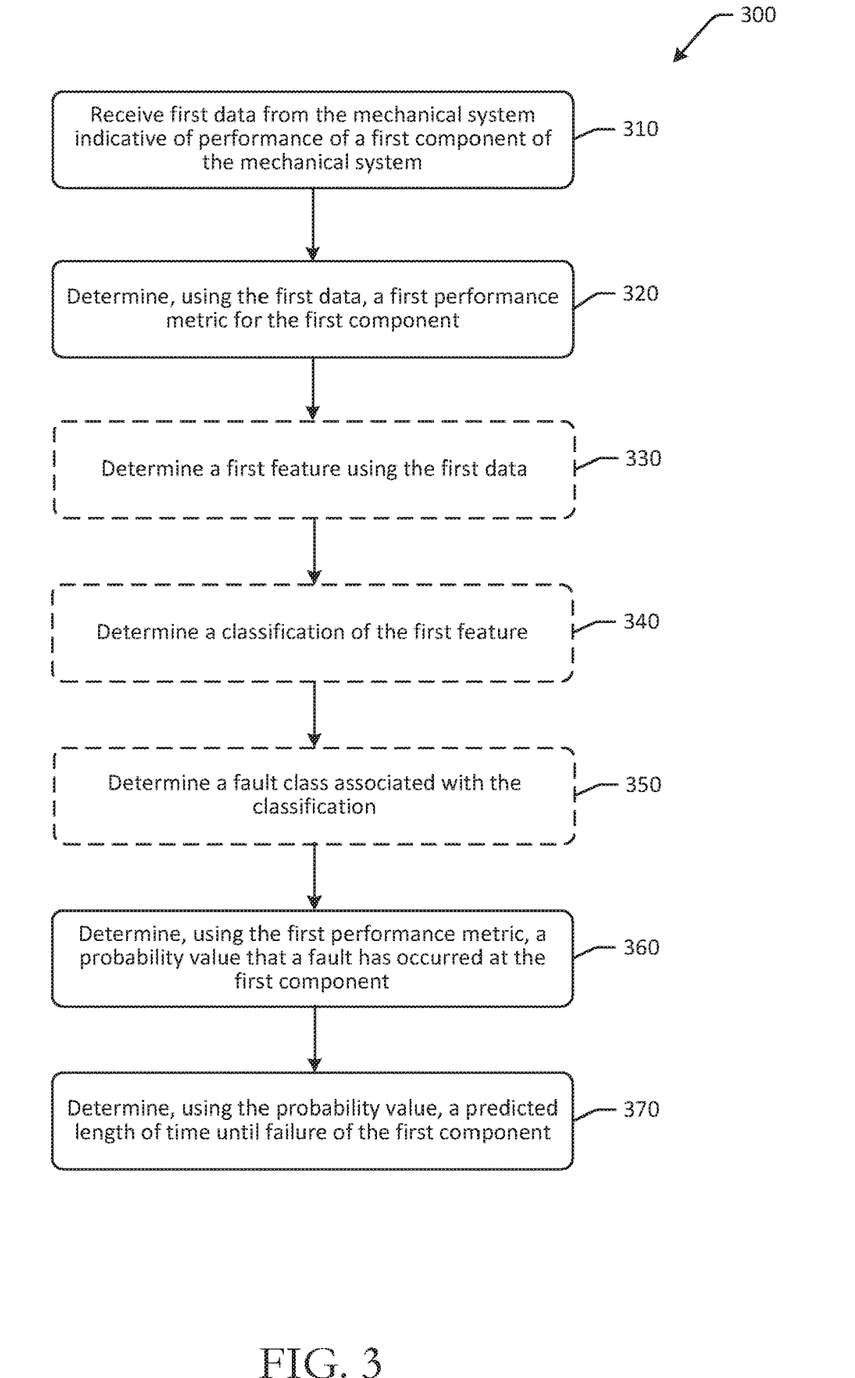
FIG. 3 is an example process flow for automated condition-based maintenance of mechanical systems as may be described herein.

FIG. 3 is an example process flow 300 for automated condition-based maintenance of mechanical systems as may be described herein. One or more of the operations described in FIG. 3 may be performed in different orders and/or by the same computer system or different computer systems across a distributed computing environment. In one example, the operations of FIG. 3 may be performed by the fault detection server 290 of FIG. 2.

At block 310, a fault detection system for detecting faults at a mechanical system may receive first data from the mechanical system indicative of performance of a first component of the mechanical system. For example, the fault detection system may include at least one memory storing computer-executable instructions, and one or more computer processors coupled to the at least one memory and configured to execute the computer-executable instructions. The fault detection system may receive first data from the mechanical system, such as a feedwater system and/or associated computer system, indicative of a performance of a first component of the mechanical system. The mechanical system may include a feedwater system for combined cycle power plants. The first component may be, for example, a pump or a motor. The first data may include data captured by one or more sensors. For example, the first data may be sensor data measured by a sensor disposed at the mechanical system. The first data may include one or more of: high frequency time-domain sampling of motor voltage data, current data, vibration or speed data, pump flow rate data, suction data, pressure data, temperature data, pump vibration data, and/or other data that may be output by sensors of the mechanical system.

In some embodiments, high frequency, time-domain sampling (e.g., 100s-1000s of Hz) of motor voltages, currents (and/or derived power and instantaneous torque), vibrations (which may include speed), may be performed, along with pump flow rates, suction and IP/HP pressures and temperatures, and pump vibrations (which may include speed).

At block 320, the fault detection system may determine, using the first data, a first performance metric for the first component. For example, the fault detection system may determine, using a database, normal operation values of the first component. The normal operation values may be based on historical data or on expected value data, such as values that may be preprogrammed. The first performance metric may be a score. For example, a score for a pump that is performing well, or in line with expectations may be 92 out of 100. Other scoring systems and methodology may be used.

At optional block 330, the fault detection system may determine a first feature using the first data. Features may be extracted from a data set, or may be determined using a data set. Features may include changes to certain data over time, which may be indicative of performance issues. In some embodiments, features may be determined by transforming the first data using a mathematical transformation operation. For example, one-second intervals of high-speed signals may be transformed using Fast Fourier Transforms, Wavelets functions, Orbit operations, Bode operations, and/or other algorithms to create features. Other mathematical transformation operation may be used.

After features are determined, the fault detection system may generate a reduced set of features, such as features that may indicate the most meaningful or important data. In some embodiments, the fault detection system may reduce the features by selecting key features. For example, features that satisfy certain numerical thresholds may be included in the reduced set of features. In another example, the reduced set of features may be determined by transforming the feature space to combine features through mathematical methods. Example mathematical methods may include filtering methods, t-tests, sequential selection, and the like, which may be selected for use based on performance criterion. Features can also be reduced using algorithmic methods such as k-Means, Principal Components Analysis, Linear Discriminant Analysis, and/or various encoders such as stacked auto-encoders based on neural networks.

In one example, the fault detection server may receive second data from the mechanical system indicative of performance of a second component of the mechanical system. The fault detection server may determine a second feature using the first data, where the first feature and the second feature form a feature set. The fault detection server may filter the feature set to generate a reduced feature set, where the reduced feature set includes the first feature and not the second feature.

At optional block 340, the fault detection system may determine a classification of the first feature. For example, the fault detection system may cluster and/or classify the reduced set of features. Example classifications may include stage of component life classifications, in one embodiment. Clustering and/or classification may be determined using Support Vector Machines, neural networks, k-nearest neighbors, or other algorithms. Features from an orbit or bode plot, in instances where orbit or bode plots are used to generate features, may be trained using one or more image classification or pattern recognition algorithms. In some embodiments, deep neural networks (e.g., convolutional neural networks, deep belief networks, etc.) may be used for classification of features. In one example, the fault detection server may be configured to determine the classification of the first feature using one or more neural networks.

At optional block 350, the fault detection system may determine a fault class associated with the classification. For example, the fault detection system may determine that a fault class associated with a classification of end of life stage of a component is a component failure fault class. In some embodiments, known fault classes may be pre-associated with or all clusters or classes. Other fault classes may be identified interactively by operators after the clusters or classes are automatically identified by the fault detection system. For example, the fault detection system may request manual identification of a fault class by an operator, and may associate the fault class with the classification using an adaptive neural network. In some embodiments, progressive learning techniques based on adaptive neural networks can be used to build models or classifier algorithms using streaming data.

At block 360, the fault detection system may determine, using the first performance metric, a probability value that a fault has occurred at the first component. For example, analysis of various components of the mechanical system may be performed using the first data. The fault detection system may determine correlations that between the performance metrics that may be continuously or periodically analyzed. The performance metrics (which may be for the same component) may be aggregated into a single performance metric for the first component (e.g. bearing temperature analysis and classification models built on drive and non-drive end vibrations spectrum of the pump may provide separate probabilities of a bearing fault occurrence, which can then be combined to indicate presence or absence of a bearing fault with higher confidence, etc.). For example, performance metrics may be used, in one embodiment, to determine a probability value that a fault has occurred at the first component.

At block 370, the fault detection system may determine, using the probability value, a predicted length of time until failure of the first component. For example, the same performance metrics determined via analysis of different components can be captured over time to forecast or predict progression of faults leading to failure of the first component. In some embodiments, Bayesian methods can be used for rare-event predictions, such as remaining useful life of components.

In some embodiments, the fault detection server may generate one or more digital user interfaces, such as those illustrated in FIGS. 4-7, to present the probability value, the predicted length of time, recommended actions, and so forth. Operators may view the user interfaces and determine whether any configuration changes are to be performed.

FIGS. 4-7 are schematic diagrams of feedwater system analytics as may be described herein. The fault detection server of FIGS. 2-3 may be configured to generate one or more user interfaces, such as those illustrated in FIGS. 4-7. Other embodiments may have different user interfaces.

The fault detection server may perform analysis based on several measurements, including, but not limited to, one or more of pump suction and discharge flows, temperatures and pressures, shaft speed, vibrations (e.g., drive end, non-drive end, etc.), and so forth. The fault detection server may generate correlations between the performance metrics arising from multiple analyses. The performance metrics may be used to generate one or more performance metrics for a specific component. In some embodiments, the fault detection server may determine, using a Bayesian algorithm, a remaining useful life value for one or more components of the mechanical system.

Figure 4:
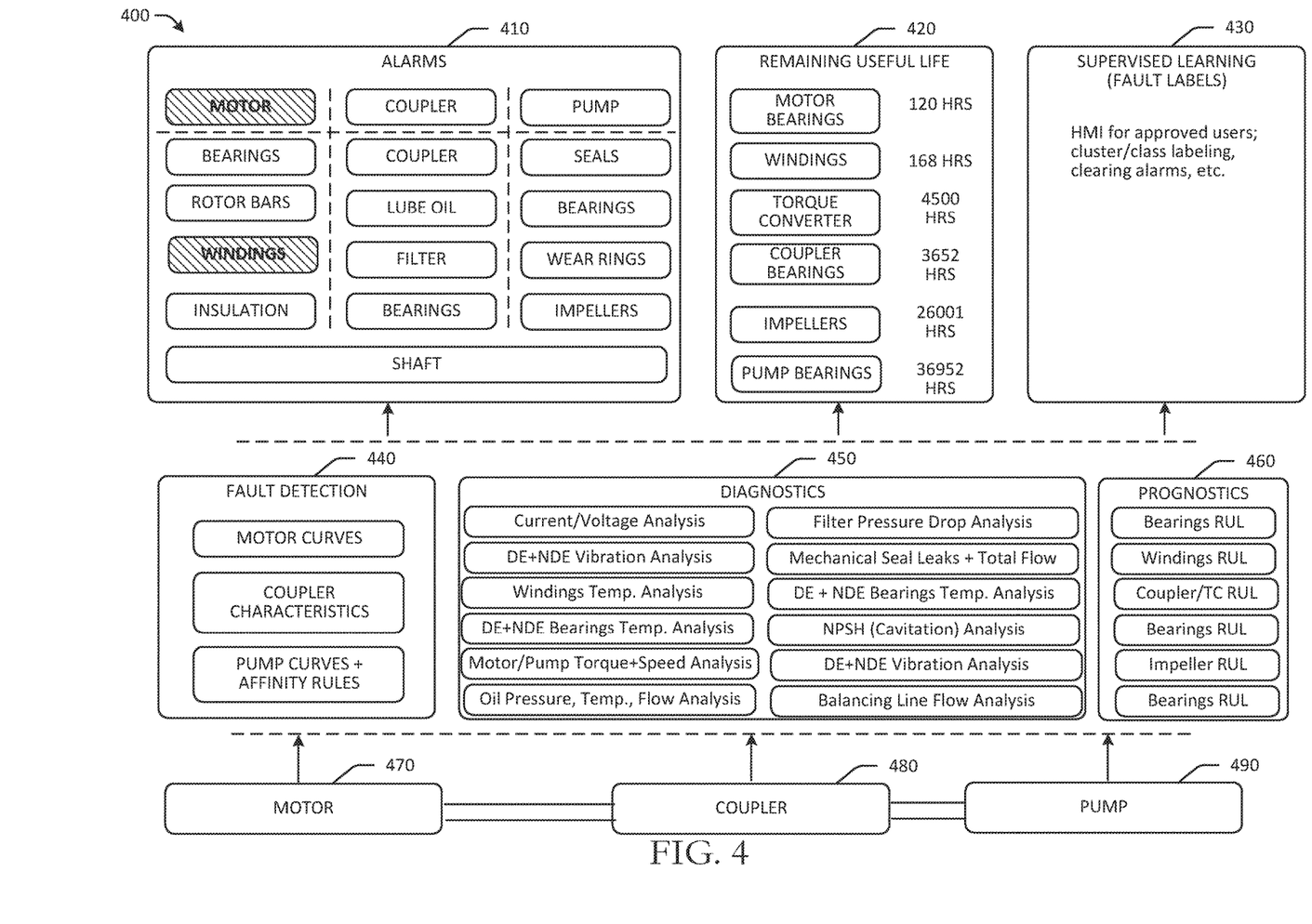
FIGS. 4-7 are schematic diagrams of feedwater system analytics as may be described herein.
Figure 5:
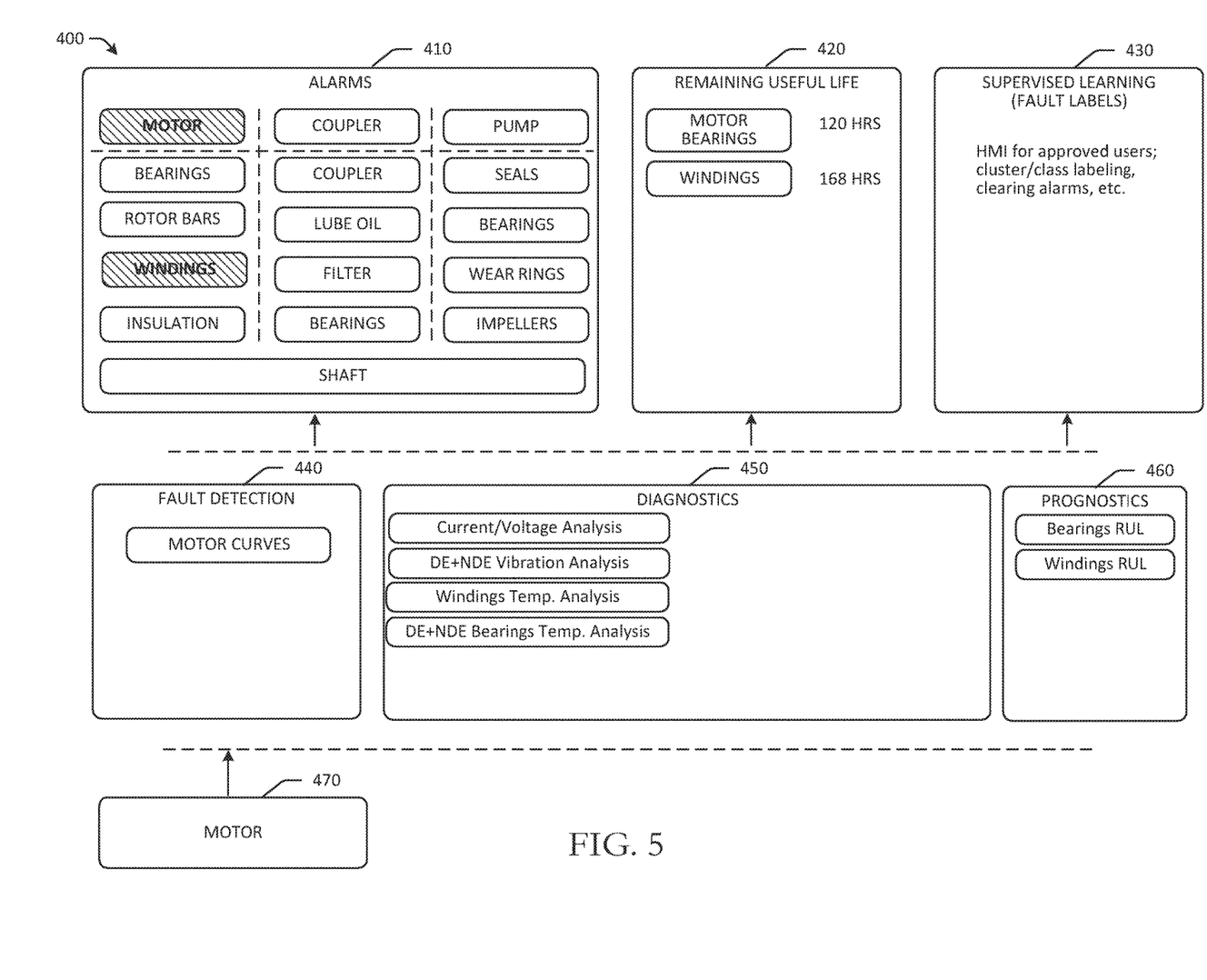
Figure 6:
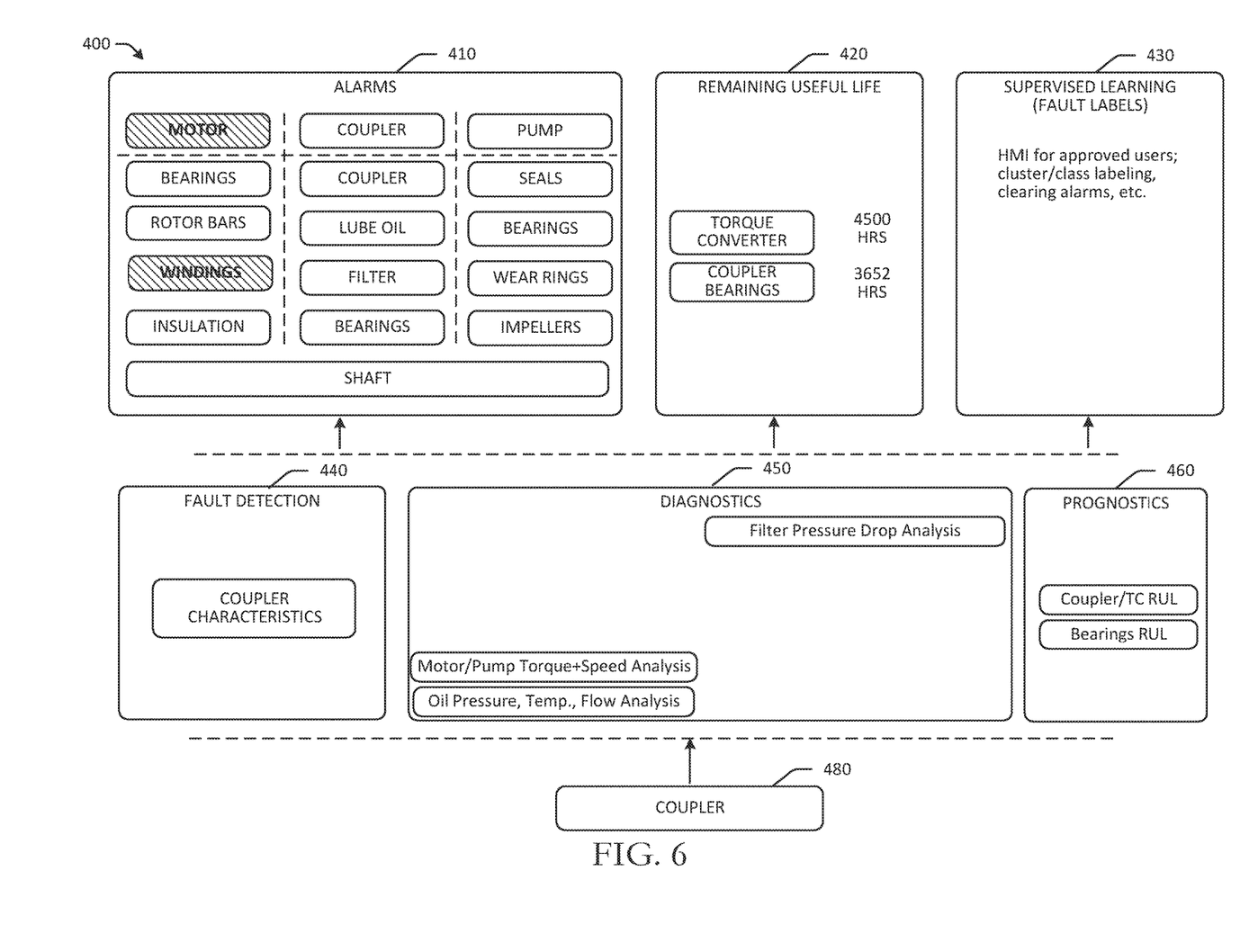
Figure 7:
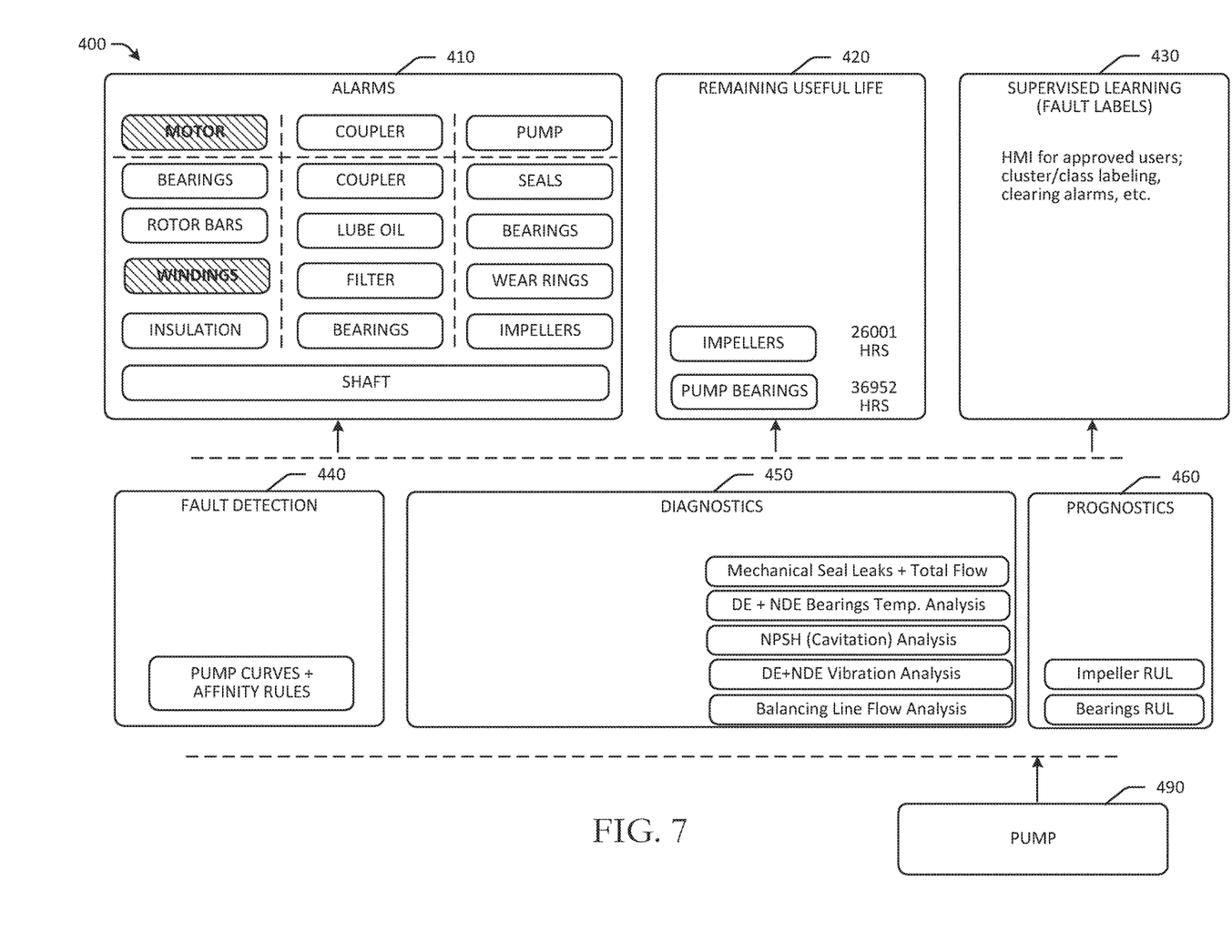

FIG. 4 illustrates an example analytics output 400 indicating analysis of a feedwater system. FIG. 5 illustrates an example analytics output that isolates performance of a motor 470 and related components of the feedwater system. FIG. 6 illustrates an example analytics output that isolates performance of a coupler 480 and related components of the feedwater system. FIG. 7 illustrates an example analytics output that isolates performance of a pump 490 and related components of the feedwater system.

In FIG. 4, the analytics output 400 may include a dashboard with a human-to-machine interface. The dashboard may include alarms 410, which may indicate components for which service and/or attention may be needed. For example, the motor and windings may be in an alarm state in the illustration of FIG. 4. The dashboard may include indicators of remaining useful life, as calculated by the fault detection server, of various components of the feedwater system. For example, the motor bearings may have a predicted remaining useful life of 120 hours, the windings may have a predicted remaining useful life of 168 hours, the torque converters may have a predicted remaining useful life of 4500 hours, the coupler bearings may have a predicted remaining useful life of 3652 hours, the impellers may have a predicted remaining useful life of 26001 hours, the pump bearings may have a predicted remaining useful life of 36952 hours, and so forth. The dashboard may include supervised learning fault labels 430, which may include a human-to-machine interface for approved users, cluster/class labeling, alarm clearing, and so forth. Accordingly, operators may use the dashboard to determine a status of various components of the feedwater system, and/or the feedwater system as a whole.

The analytics output 400 may include fault detection analytics 440, diagnostics 450, and/or prognostics 460. The respective fault detection analytics 440, diagnostics 450, and/or prognostics 460 may include data for various components of the feedwater system, such as the motor 470, coupler 480, and pump 490. The fault detection analytics 440, diagnostics 450, and/or prognostics 460 may be determined using high speed data sampling, modeling, clustering, classification, alarm, and/or life forecasting.

FIG. 5 illustrates an example analytics output that isolates performance of a motor 470 and related components of the feedwater system. For example, the remaining useful life 420 of motor components may include motor bearings and windings. The fault detection analytics 440 of motor components may include motor curve data. The diagnostics 450 of motor components may include current/voltage analysis, drive end and non-drive end vibration analysis, windings temperature analysis, and drive end and non-drive end bearing temperature analysis. The prognostics 460 of motor components may include bearings and windings.

FIG. 6 illustrates an example analytics output that isolates performance of a coupler 480 and related components of the feedwater system. For example, the remaining useful life 420 of coupler components may include torque converter and coupler bearings. The fault detection analytics 440 of coupler components may include coupler characteristics data. The diagnostics 450 of motor components may include motor/pump torque and speed analysis, oil pressure, temperature, and flow analysis, and filter pressure drop analysis. The prognostics 460 of coupler components may include bearings and coupler/torque converter.

FIG. 7 illustrates an example analytics output that isolates performance of a pump 490 and related components of the feedwater system. For example, the remaining useful life 420 of pump components may include pump bearings and impellers. The fault detection analytics 440 of pump components may include pump curve data and affinity rules or laws. The diagnostics 450 of pump components may include mechanical seal leaks and total flow analysis, drive end and non-drive end bearing temperature analysis, NPSH (cavitation) analysis, drive end and non-drive end vibration analysis, and balancing line flow analysis. The prognostics 460 of pump components may include bearings and impellers.

Accordingly, operators may use the analytics to determine predicted remaining useful life and component status, thereby allowing for advanced scheduling and reduced downtime due to avoidable and unavoidable issues at a power plant.

During example operation of the fault detection system, the fault detection system may receive first data from the mechanical system indicative of performance of a first component of the mechanical system, determine, using the first data, a first performance metric for the first component, determine, using the first performance metric, a probability value that a fault has occurred at the first component, and determine, using the probability value, a predicted length of time until failure of the first component.

Figure 8:
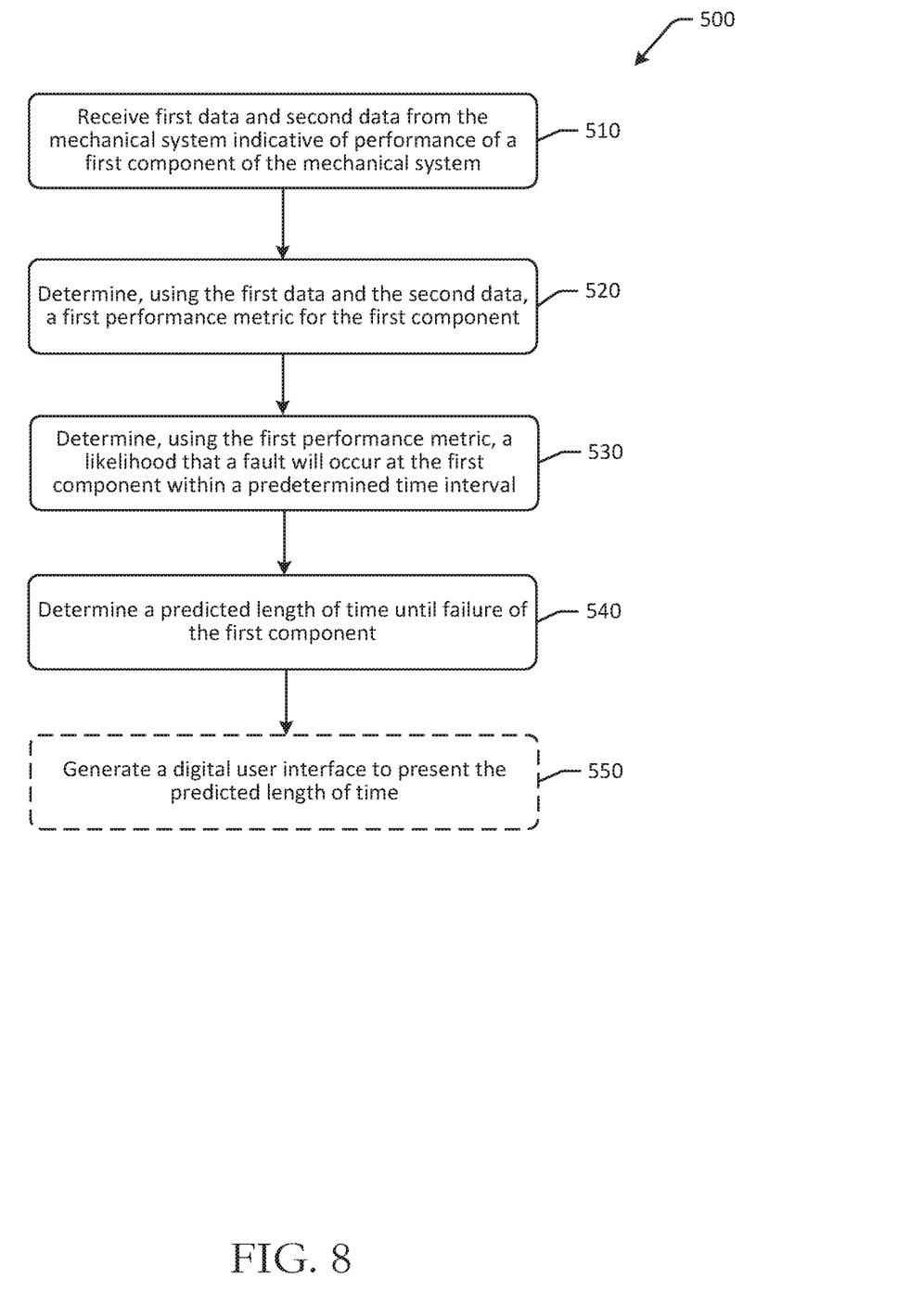
FIG. 8 is another example process flow for automated condition-based maintenance of mechanical systems as may be described herein.

FIG. 8 is another example process flow 500 for automated condition-based maintenance of mechanical systems as may be described herein. One or more of the operations described in FIG. 8 may be performed in different orders and/or by the same computer system or different computer systems across a distributed computing environment. In one example, the operations of FIG. 8 may be performed by the fault detection server 290 of FIG. 2.

At block 510, a fault detection system for detecting faults at a mechanical system may receive first data and second data from the mechanical system indicative of performance of a first component of the mechanical system. For example, the fault detection system may include at least one memory storing computer-executable instructions, and one or more computer processors coupled to the at least one memory and configured to execute the computer-executable instructions. The fault detection system may receive first data and second data from the mechanical system indicative of performance of a first component of the mechanical system. The first data and the second data may be separate data points for the same component. For example, bearing temperature analysis and classification models built on drive and non-drive end vibrations spectrum of the pump may provide separate probabilities of a bearing fault occurrence, which can then be combined to indicate presence or absence of a bearing fault with higher confidence. At block 520, the fault detection system may determine, using the first data and the second data, a first performance metric for the first component. At block 530, the fault detection system may determine, using the first performance metric, a likelihood that a fault will occur at the first component within a predetermined time interval. At block 540, the fault detection system may determine a predicted length of time until failure of the first component. At optional block 550, the fault detection system may generate a digital user interface to present the predicted length of time.

As a result of improved detection of component status and prediction of failure, backup feedwater systems may no longer be needed. Some embodiments may improve availability of mechanical systems, such as feedwater systems, such that service required by the feedwater system may be provided at scheduled plant outages. By maximizing asset availability, cost savings of reducing or eliminating redundant systems may be achieved.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

We claim:

1. A fault detection system for detecting faults at a mechanical system, the fault detection system comprising:
   one or more sensors configured to detect measurements for a plurality of components of the mechanical system, wherein the one or more sensors comprise at least one torque meter, key phasor sensor, temperature sensor, flow sensor, motor winding insulation leakage current sensor, relative shaft vibration sensor, casing temperature sensor, suction sensor, pressure sensor, or axial displacement sensor;
   at least one memory storing computer-executable instructions; and
   one or more computer processors coupled to the at least one memory and configured to execute the computer-executable instructions to:
      receive first data from the one or more sensors indicative of performance of a first component of the mechanical system;
      determine, using the first data, a first performance metric for the first component;
      determine, using the first data, a second performance metric for the first component;
      aggregate the first performance metric and the second performance metric;
      determine, using the aggregated performance metrics, a probability value that a fault has occurred at the first component;
      determine, using the aggregated performance metrics and the probability value, a predicted length of time until failure of the first component;
      generate a digital user interface to present the predicted length of time; and
      generate, using the aggregated performance metrics and the probability value, an alarm indicating that the first component may need service.

2. The fault detection system of claim 1, wherein the mechanical system comprises a feedwater system for combined cycle power plants.

3. The fault detection system of claim 1, wherein the one or more computer processors is further configured to:
   determine, based on the first data, that an operating efficiency of the mechanical system has decreased, wherein a decrease in operating efficiency is indicative of abnormal operation.

4. The fault detection system of claim 1, wherein the one or more computer processors is configured to determine a first feature using the first data by transforming the first data using a mathematical transformation operation.

5. The fault detection system of claim 4, wherein the one or more computer processors is further configured to:
   receive second data from the mechanical system indicative of performance of a second component of the mechanical system;

determine a second feature using the first data, wherein the first feature and the second feature form a feature set; and filter the feature set to generate a reduced feature set, wherein the reduced feature set comprises the first feature.

6. The fault detection system of claim 1, wherein the one or more computer processors is further configured to:

receive second data from the mechanical system indicative of performance of the first component of the mechanical system;

wherein the first performance metric is determined using the first data and the second data.

7. The fault detection system of claim 1, wherein the one or more computer processors is further configured to:

determine, using a Bayesian algorithm, a remaining useful life value for the first component.

8. The fault detection system of claim 1, wherein the one or more computer processors is further configured to:

generate a digital user interface to present the probability value indicating a likelihood that a fault has occurred at the first component, and the predicted length of time.

9. The fault detection system of claim 1, wherein the one or more computer processors is further configured to:

determine a first feature using the first data;

determine a classification of the first feature; and determine a fault class associated with the classification.

10. The fault detection system of claim 9, wherein the one or more computer processors is further configured to:

request manual identification of the fault class by an operator; and associate the fault class with the classification using an adaptive neural network.

11. The fault detection system of claim 9, wherein the fault class is pre-associated with the classification.

12. The fault detection system of claim 9, wherein the one or more computer processors is configured to determine the classification of the first feature using one or more neural networks.

13. The fault detection system of claim 1, wherein the first data comprises one or more of: high frequency time-domain sampling of motor voltage data, current data, vibration or speed data, pump flow rate data, suction data, pressure data, temperature data, or pump vibration data.

14. A method for detecting faults at a mechanical system, the method comprising:

receiving, by a server, first data from one or more sensors in the mechanical system indicative of performance of a first component of the mechanical system, comprise at least one torque meter, key phasor sensor, temperature sensor, flow sensor, motor winding insulation leakage current sensor, relative shaft vibration sensor, casing temperature sensor, suction sensor, pressure sensor, or axial displacement sensor, and wherein the first data comprises performance metrics for one or more components of the mechanical system in addition to the first component;

determining, using the first data, a first performance metric for the first component;

determining, using the first data, a second performance metric for the first component;

aggregating the first performance metric and the second performance metric;

determining, using the aggregated performance metrics, a probability value that a fault has occurred at the first component;

determining, using the aggregated performance metrics and the probability value, a predicted length of time until failure of the first component; and generating, using the aggregated performance metrics and the probability value, an alarm indicating that the first component may need service.

15. A fault detection server comprising:

at least one memory storing computer-executable instructions;

one or more computer processors coupled to the at least one memory and configured to execute the computer-executable instructions to:

receive first data and second data from one or more sensors in a mechanical system indicative of performance of a first component of the mechanical system, wherein the one or more sensors comprise at least one torque meter, key phasor sensor, temperature sensor, flow sensor, motor winding insulation leakage current sensor, relative shaft vibration sensor, casing temperature sensor, suction sensor, pressure sensor, or axial displacement sensor;

determine, using the first data and the second data, a first performance metric for the first component;

determine, using the first performance metric, a probability value indicative of a likelihood that a fault will occur at the first component within a predetermined time interval;

determine a predicted length of time until failure of the first component;

generate a digital user interface to present the predicted length of time; and generate, using the first performance metric and the probability value, an alarm indicating that the first component may need service.

16. The fault detection server of claim 15, wherein the mechanical system comprises a feedwater system for combined cycle power plants.

17. The fault detection server of claim 15, wherein the one or more computer processors is further configured to:

determine a first feature using the first data;

determine a classification of the first feature; and determine a fault class associated with the classification.

18. The fault detection server of claim 15, wherein the one or more computer processors is further configured to:

request manual identification of the fault class by an operator; and associate the fault class with the classification using an adaptive neural network.

19. The fault detection server of claim 15, wherein the first data comprises one or more of: high frequency time-domain sampling of motor voltage data, current data, vibration or speed data, pump flow rate data, suction data, pressure data, temperature data, or pump vibration data.

* * * * *